July 15, 1969  A. H. SCHLEMMER  3,455,120
CRYOGENIC CONVEYOR FREEZER
Filed Sept. 8, 1966  5 Sheets-Sheet 5

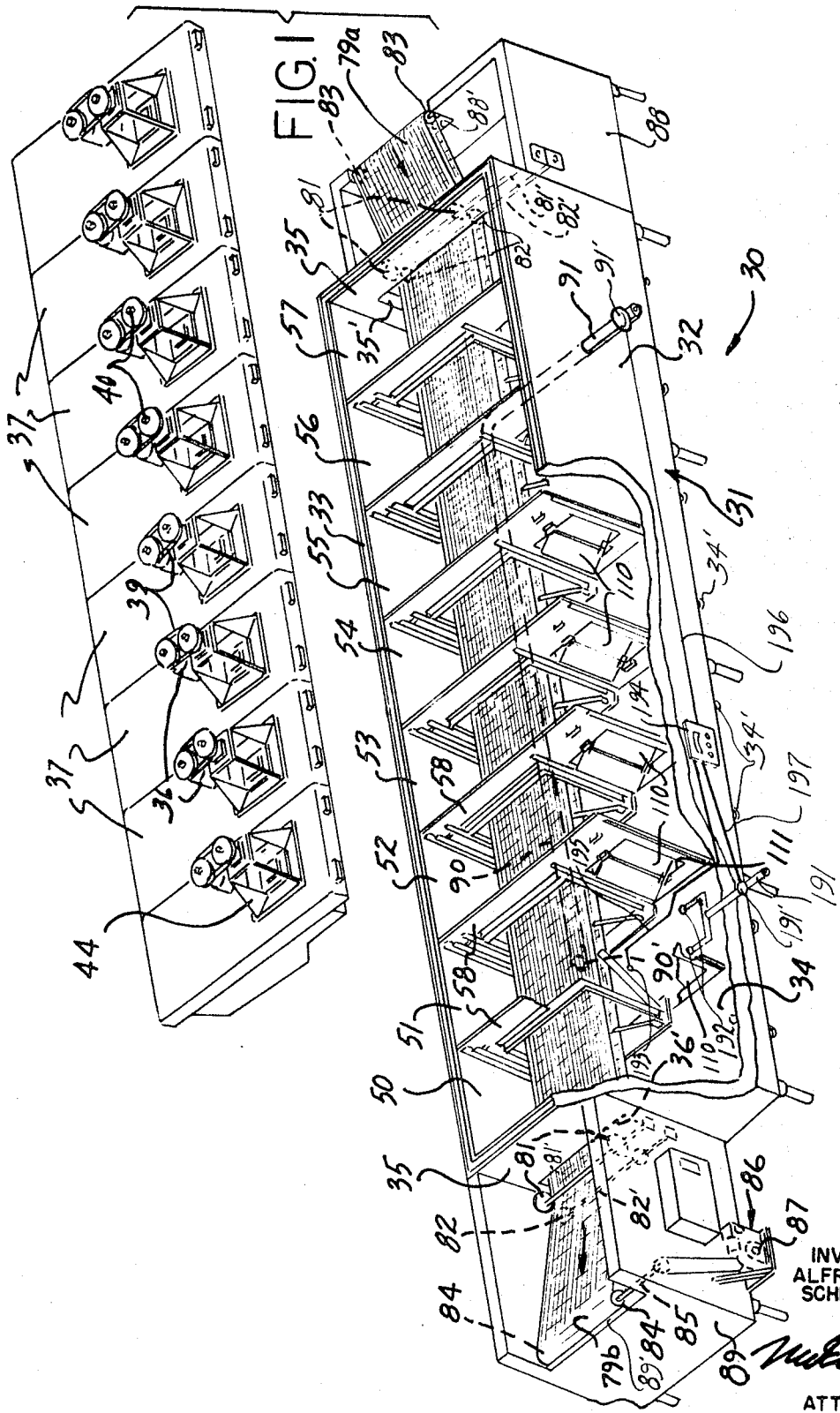

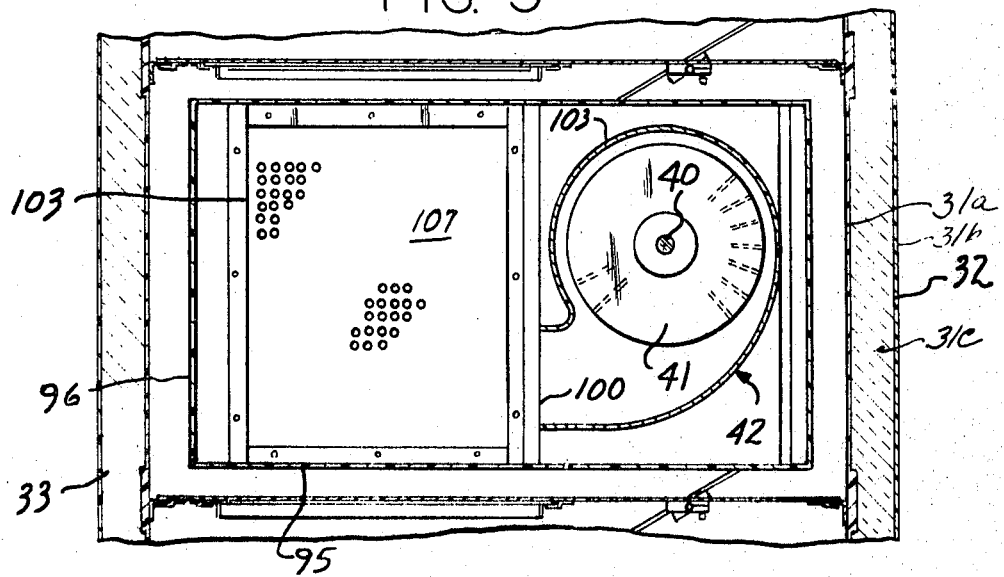
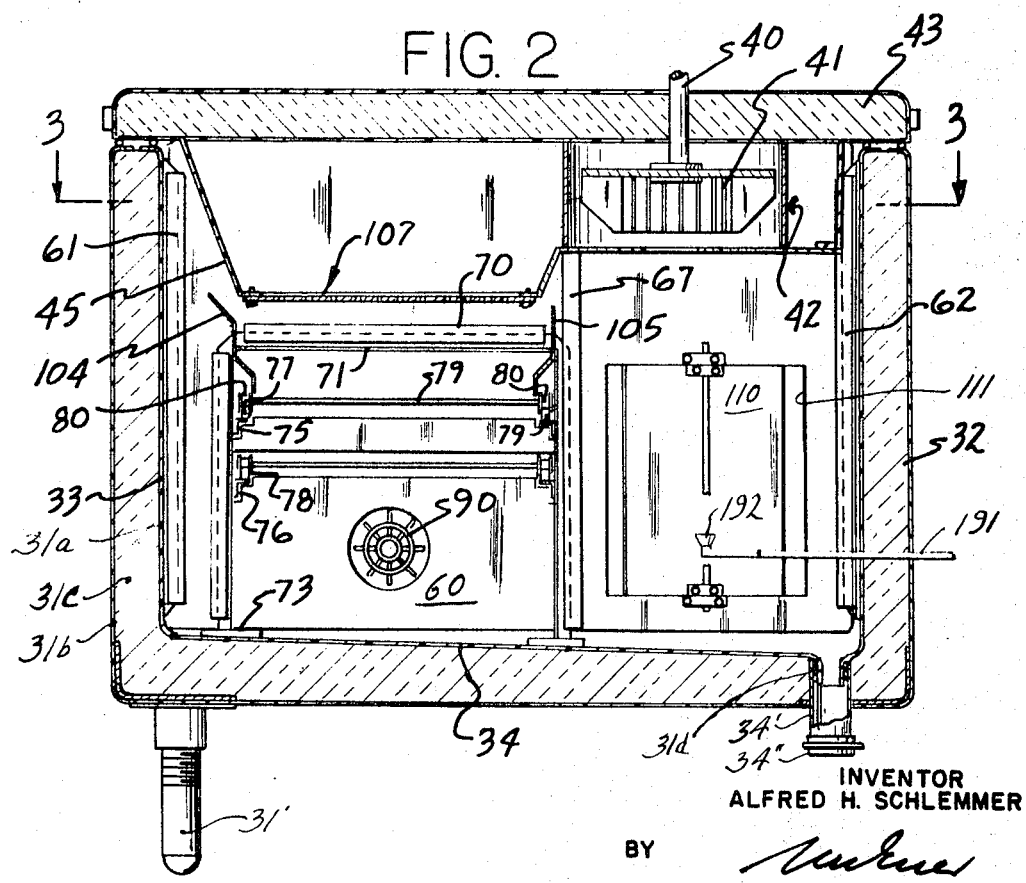

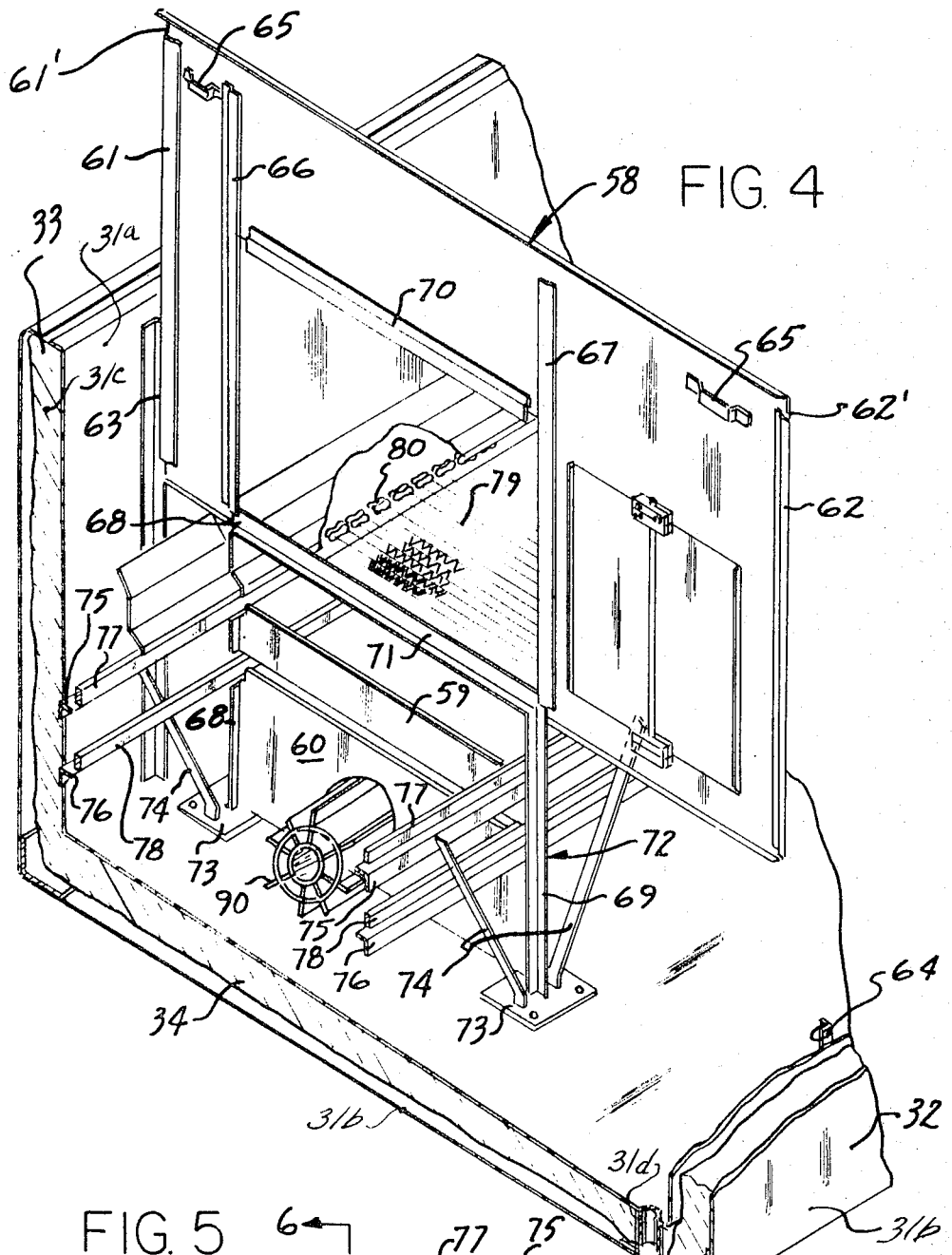
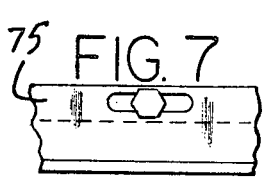

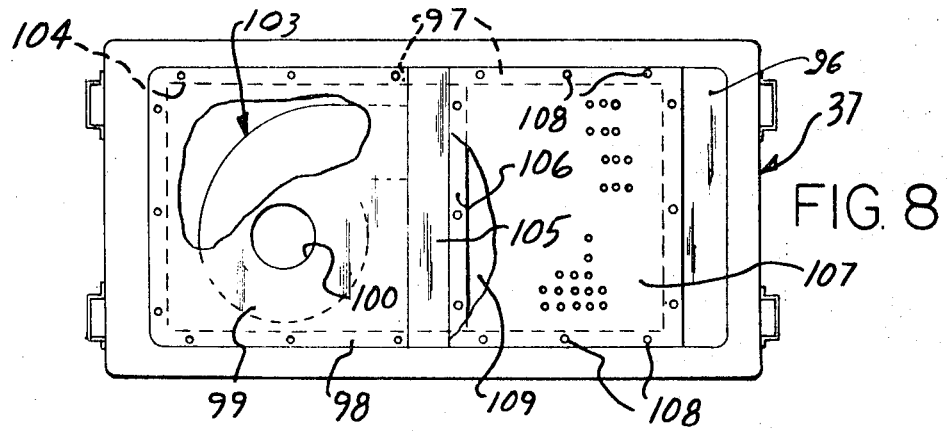
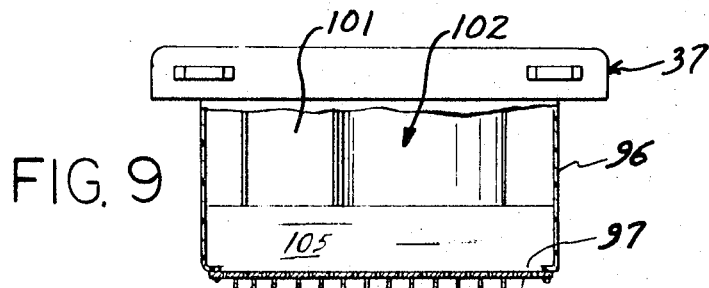
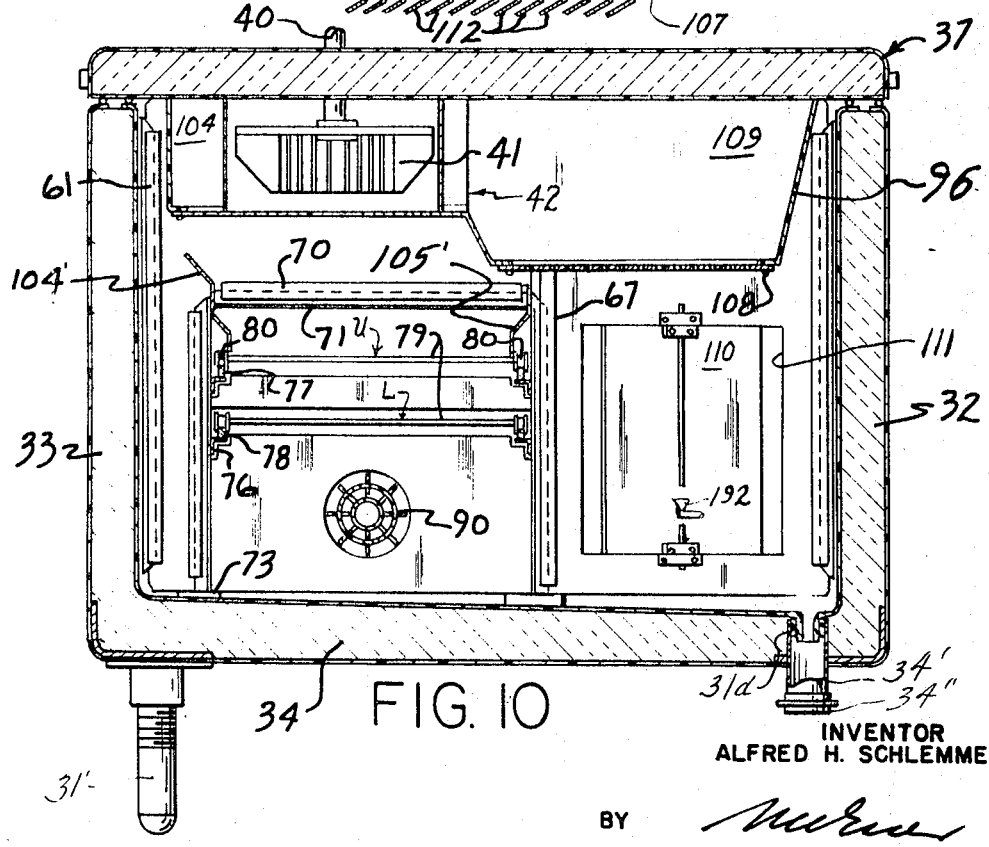

INVENTOR
ALFRED H. SCHLEMMER

BY

ATTORNEY

United States Patent Office 3,455,120
Patented July 15, 1969

3,455,120
CRYOGENIC CONVEYOR FREEZER
Alfred H. Schlemmer, Indianapolis, Ind., assignor to Chemetron Corporation, Chicago, Ill., a corporation of Delaware
Filed Sept. 8, 1966, Ser. No. 578,056
Int. Cl. F25d 13/06, 23/02
U.S. Cl. 62—266                    19 Claims

ABSTRACT OF THE DISCLOSURE

Apparatus having adjacent, connecting zones through which products to be cooled are conveyed, and means for circulating vapor from a cold liquefied gas supply into one or more zones for rapidly freezing the product, said vapors being further directed into upstream zones to precool incoming products as they are moved toward the freezing zone.

---

This invention relates to apparatus for freezing products.

Apparatus in accordance with a specific embodiment of the invention comprises an elongated housing the inside of which is divided transversely into zones, a conveyor for conveying product through the zones in the housing, the housing including a series of removable cover assemblies substantially throughout its length, the zones being formed by removable dividers, each cover assembly having a blower, a distribution chamber and blower drive mechanism preferably removable as a unit, and a vaporizer for cold liquefied gas extending through several zones and having a discharge end opening into a zone near the outfeed end of the housing, the dividers being constructed to provide for passage of gas in an upstream direction through the zones in the housing.

In the drawings:

FIGURE 1 is a perspective view of a freezer in accordance with the invention showing cover assemblies separated from the remainder of the freezer;

FIGURE 2 is a transverse sectional view of the freezer;

FIGURE 3 is a sectional view taken along line 3—3 of FIGURE 2,

FIGURE 4 is a perspective view showing in detail one of the dividers which define the zones;

FIGURE 5 is a broken away top plan view of a track and track mounting structure shown in FIGURES 1, 2 and 4;

FIGURE 6 is a sectional view taken along line 6—6 of FIGURE 5;

FIGURE 7 is a fragmentary view showing a portion of the track and track mounting structure shown in FIGURE 5;

FIGURE 8 is a bottom plan view of one of the cover assemblies;

FIGURE 9 is an end view of a cover assembly, showing baffles for directing the gas stream in a downward and upstream direction in the freezer;

FIGURE 10 is a sectional view showing the cover assembly reversed from the position shown in FIGURE 2 for example;

Figure 11:
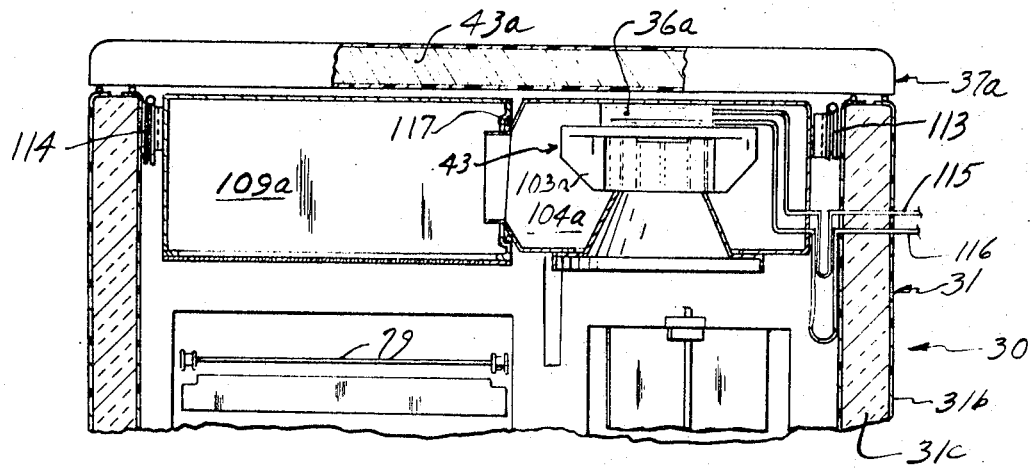
FIGURE 11 is a sectional view of a freezer as shown in FIGURES 1 through 9, but having a blower and motor and the distribution chamber mounted for independent pivotal movement.

Referring to the embodiment of FIGURES 1 through 9 of the drawings, there is shown a freezer generally indicated at 30. The freezer 30 has an elongated housing 31 having insulated walls or sides 32 and 33, a sloped floor 34, opposite end walls 35 and 36, and adjustable legs 31'. The housing 31 has an open top side which during use is closed off by a series of cover assemblies 37. Each cover assembly is provided with an electric motor 38, a speed reducer 39, connected to a drive shaft 40 which in turn drives a vane element 41 of a blower or fan generally indicated at 42. The cover assemblies 37 are preferably identical to each other for economy of manufacture. Each cover assembly 37 includes an insulated cover or panel section 43 which mounts the motor 38 and speed reducer 39 by means of a frame 44. The panel section 43 also mounts the blower 42, and a distribution chamber 45. The panel section 43 rests upon the upper edges of the walls 32 and 33 and the end panels also rest upon respective end walls 35 and 36. The blowers 42 are designed to handle a large volume of heat exchange medium, for example the vapor of cold liquefied gas such as gaseous nitrogen or carbon dioxide.

The housing 31 has its inside space divided into compartments or zones 50 through 57 by removable dividers or partitions 58 and by plates 59 and 60. As illustrated, cold liquefied gas can be discharged in zone 51; zones 52, 53, 54, 55 and 56 are used for pre-cooling the product, and zone 50 is used for post-cooling the product. Z-shaped elements 61 and 62 and the marginal ends of each divider 58 provide grooves 61' and 62'; angles 63 and 64 fit into respective grooves 61' and 62'. Handles 65, secured to each removable divider 58, can be used to lift the individual divider 58 out of the housing 31. Z-shaped elements 66 and 67, secured to each divider 58, are received by flanges 68 and 69, while a Z-shaped element 70 is received by a flange 71. Flanges 68, 69 and 71 extend in a vertical plane and are part of an inverted U-shaped member generally indicated at 72. The U-shaped member 72 is secured to mounting plates 73. The mounting plates 73 are suitably secured to the floor 34. Upwardly and outwardly extending braces 74 are secured to the mounting plates 73. Spaced apart track mounts 75 and 76 are secured to the braces 74 as by welding. The braces 74 can withstand flexure due to expansion and contraction of track mounts 75 and 76. The track mounts 75 and 76 mount tracks 77 and 78, respectively.

An endless conveyor belt 79, preferably of mesh construction, is connected at each side to a continuous roller chain 80. The chains 80 slide on tracks 77. The tracks 77 extend the length of the housing 31 but terminate short of the upper and lower sets of respective sprockets 81 and 82. Roller chains 80 are trained about sprockets 83 and 84 at opposite ends of the freezer 30. As shown sets of sprockets 81, 82 and 83 are suitably rotatably mounted and serve as idler sprockets. Sprockets 84 are secured to a drive shaft 85 rotated by a variable speed drive mechanism 86 having an electric motor 87. Sprockets 81 and 82 are mounted on respective shafts 81' and 82'. As the sprockets 83 and 84 are disposed above the levels of respective sets of sprockets 81 and 82, the belt 79 slopes at its infeed and outfeed ends 79a and 79b. The conveyor belt 79 passes through relatively narrow openings 35' and 36' in respective end walls 35 and 36.

Suitably connected to the ends of the housing 31 are traps or vestibules 88 and 89 which serve to trap vapor issuing through the respective openings 35 and 36. The top edges of the vestibules 88 and 89 are above the upper edges of respective openings 35' and 36'. The lowermost edge 89' of the upper end of the trap 89 is preferably at a higher elevation than the lowermost edge 88' of the upper end of the trap 88 to cause a pressure head to exist tending to assist passage of vapor through the zones 50 through 57 of the housing in an upstream direction. Vapor of cold liquefied gas overflowing from vestibules 88 and 89 escapes into the ambient air. A vaporizer 90, extending through several zones of the housing 31, is connected to a suitable valved conduit 91 to a source of cold liquefied gas supply. The vaporizer 90 shown to take the form of a finned tube, shown in section in FIGURE 2, is slightly pitched downwardly toward its open discharge end 90'. The temperature of the vapor in each successive pre-cooling zone 52 through 57, upstream of the zone 51 where the discharge end 90' is located, is lower than the preceding zone. The zone 50 is the coldest zone and hence is referred to as the "freezing zone" although freezing occurs in the other zones as well. Thus, by extending the vaporizer 90 through several or all of the pre-cooling zones, vaporization of cold liquefied gas occurs in the pre-cooling zones where the temperature of the vapor as compared with the temperature of the cold liquefied gas in the vaporizer 90 is greater than the temperature of the vapor in the zone where vapor is discharged from the discharge end 90' of the vaporizer 90, thereby facilitating vaporization of the cold liquefied gas. The vaporizer 90 can be constructed to discharge vapor into more than one zone, for example into zones 50 and 51. More than one such vaporizer 90 can be provided, if desired. If desired, cold liquefied gas can be supplied into the space below the belt 79 in the zone 51, or into the space immediately ahead of the inlet of the blower 42 in the zone 51. A conduit 191 connected to a source of cold liquefied gas is shown to be connected to a plurality of nozzles 192 which can be of the atomizing type. A sensing element 193 is connected, by a conductor 195, to a controller 194 which can control either one or both valves 91' or 191' by respective conductors 196 and 197 to hold the temperature in the freezing zone 51 at a preselected value. Zones 52 through 57 are progressively warmer than zone 51 and the post-cooling zone 50 is warmer than the zone 51.

The cover assemblies 37 each include the panel section 43, and a formed section 96 which can be molded of flexible material such as fiber glass which can be rendered substantially rigid by means of a suitable bonding material. The formed section 96 has a continuous flange 97. A formed metal plate 98 includes a flat portion 99 having an inlet port 100. The port 100 is concentric with the axis of a vane element 41 of the lower 42. A scroll-shaped housing 103, communicating with inlet 100, surrounds the element 41. The housing 103 is disposed in a blower chamber 104 defined by the panel section 43, the formed section 96 and the plate 99. The plate 99 also has an angled portion 105 having flange 106. A perforate plate 107 is shown to be removably secured to flanges 97 and 106 by threaded fasteners 108. The panel section 43, the formed section 96 and the perforate plate 107 form a distribution chamber 109. In order that a large volume of vapor of cold liquefied gas is circulated and recirculated in a flow circuit in each zone, the number and size of the perforations or openings in the distribution plate 107 should be such as to affect substantial equality of distribution of vapor over the entire width of the conveyor belt 79 in each zone. Baffles 104' and 105' confine vapor discharged through plate 107 to the area of the conveyor belt 79. The plates 104 and 105 also prevent product on the upper flight U of the conveyor belt 79 from contacting the roller chains 80.

In the operation of the freezer 30, cold liquefied gas is admitted into the vaporizer 90 in such amounts as is required. Vapor discharged from the vaporizer 90 into the zone 51 enters the space below the blower. Suction created by the fan blower causes vapor to be drawn in through port 100. Vapor is exhausted by the blower 102 into the distribution chamber 109, from which it is discharged through perforations in the distributor plate 107 in heat exchange relation with product on the upper flight U of the conveyor belt 79. The vapor which has been warmed by the product passes through the upper and lower flights U and L of the conveyor belt 79 and into contact with the vaporizer 90; thus, the vapor is continuously circulated and recirculated. Should the amount of vapor constituting the output of the vaporizer 90 be in excess of that required, flow through the conduit 91 to the vaporizer 90 is stopped or diminished. Whenever the vaporizer 90 is operating and as the vapor in zones 51 expands, vapor will seek to escape from that zone or zones. It is desired that as much of the vapor as possible be passed through the compartments 53, 54, 55, 56 and 57 and that as little vapor as possible pass into the zone 50 or the associated trap 89. As each of the dividers 58 have openings 111 there can be communication between next adjacent zones, provided valves 110 are at least partly open. Openings 111 are sufficiently large to permit passage of the vapor in an upstream direction. The valve 110 between zones 50 and 51 is normally closed so that the amount of cold liquefied gas passing to the zone 50 from the zone 51 is held to a minimum. There is, however, a narrow slot above the upper flight U of the conveyor belt to provide product clearance, which permits a limited amount of communication between next adjacent zones. As the cold liquefied gas expands, most of it is directed upstream through successive zones 52, 53, 54, 55, 56 and 57 from which it passes into the trap 88. As the vapor passes upstream it mixes with vapor in the zone to which it has passed. Thus, the product is pre-cooled before it enters the zone 51 where the vapor is the coldest. The valves 110 are particularly useful in instances during times when flow of cold liquefied gas to the vaporizer 90 is interrupted because they can affect holding of the vapor for longer periods of time in any one zone.

The cover assembly 37 shown in FIGURE 9 is the same as the other cover assemblies 37, but it has, in addition, a series of baffles 112. This cover assembly 37 together with its baffles 112 is preferably employed at the zone 50, which is considered to be the post-cooling zone, but other or all of the cover assemblies 37 can be provided with such baffles 112, if desired. The baffles 112 are shown to be disposed between each row of perforations except the last two rows of perforations; and the baffles 112 are shown to extend downwardly and in forward directions with respect to the zones of the freezer 30. The baffles 112, thus, direct the vapor downwardly and in a forward direction to force most of the vapor to pass through the zones 50 through 57 in an upstream direction.

In the embodiment of the invention shown in FIGURE 10 the same components are employed as in the embodiment of FIGURES 1 through 9, except that the cover assemblies 37, only one of which is shown in FIGURE 10, are reversed relative to the remainder of the freezer, and hence the same reference characters are used. The flow circuit or path in each zone in which the vapor circulates and recirculates is the reverse from the flow circuit or path in which the vapor circulates and recirculates in each zone in the embodiment of FIGURES 1 through 9.

Referring to the embodiment of FIGURE 11 there is shown an alternative form cover assembly 37a for the freezer 30. The cover assembly 37a comprises an insulated panel section 43a. A blower chamber 104a communicates with a distribution chamber 109a. The blower chamber is pivotally mounted by a hinge 113 and the distribution chamber is pivotally mounted by a hinge 114. With the panel section 43a removed, the blower chamber 104a and the distribution chamber 109a can be swung out of their positions within the housing 31 to positions outside the housing 31, thereby permitting easy access to the inside of the housing 31 for cleaning purposes for example. Blower 43a is driven by an air motor 36a secured in blower housing 103a. The air motor is driven by air under pressure passing through flexible conduit 115 and the air is vented through flexible conduit 116. A seal 117 is disposed between the blower chamber 104a and the distribution chamber 109a. In the embodiment of FIGURE 11, each of the cover assemblies 37a can be of the same construction.

Figure 12:
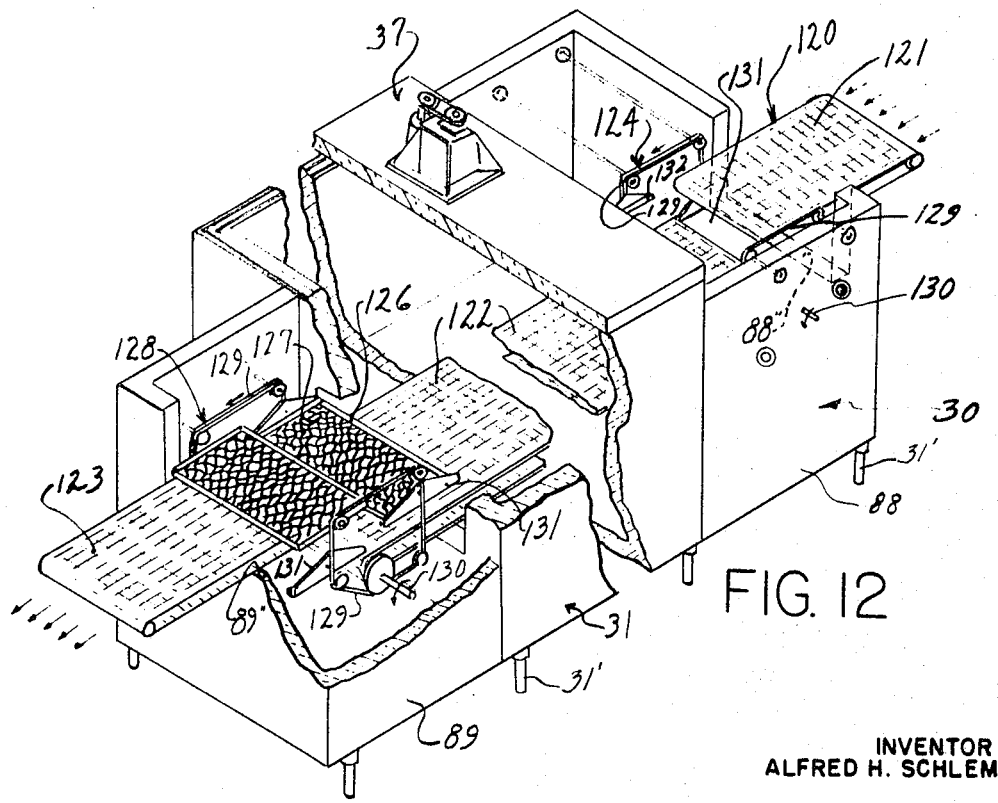
FIGURE 12 is a perspective view showing a freezer in accordance with the embodiment of FIGURES 1 through 9, but showing an alternative form of conveyor.

Referring now to the embodiment of FIGURE 12 in which the freezer 30 is constructed identical to the one illustrated in FIGURES 1 through 9, but has a different conveyor system, generally indicated at 120. The conveyor system 120 has an infeed conveyor 121, a conveyor 122, and an outfeed conveyor 123. A transferring mechanism 124 transfers trays 125 having a rectangular frame 126 and mesh 127, one at a time, from the infeed conveyor 121 onto the conveyor 122. After the trays, with product in them have been conveyed through the housing 31 of the freezer 30, they are transferred by means of a transferring mechanism 128 from the conveyor 122 onto the conveyor 123. The transferring mechanisms 124 and 128 can have the same functional elements, namely, a pair of endless chains 129 driven by sprockets off a common shaft 130. Transferring members 131 pivotally connected to the chains 129 have flanges 132 which support the frames 126 of the trays 125. The transferring members 131 of the transferring mechanism 124 lifts a tray 125 from the infeed conveyor 121, moves the tray 125 forward beyond the discharge end of the infeed conveyor 121, and then deposits the tray 125 onto the conveyor 122. The transferring members 131 of the transferring mechanism 128 lifts a tray from the conveyor 122 to a position above the level of the conveyor 123 and then in a forward direction, and thereafter in a downward direction to deposit the tray 125 onto the conveyor 123.

The uppermost surface 89″ of the trap 89 is disposed at a higher elevation than the uppermost surface 89″ of the trap 88″ to cause a pressure head to exist tending to force vapor in an upstream direction through the zones of the housing 31.

As the entire floor 34 is sloped toward one side at which drains 34′ are located, any liquid such as water or other cleaning solution will drain into and through drains 34′. The drains 34′ are normally closed as by removably secured caps 34″.

The housing 31 is composed of an inner liner 31a and an outer jacket 31b which are spaced apart and separate and distinct from each other, so that the inner liner 31a can contract and expand independently of the jacket and insulation material 31c. The insulation material 31c is not adhered to the inner liner 31a. The drains 34 are connected to the floor 34 by resilient seals 31d to permit free contraction and expansion of the entire inner liner 31a.

It is understood that the vapor of cold liquefied gas can be supplied to the zone 51 and other desired zones through either the vaporizer 90 or the nozzles 192 or both, the controller 194 in any case operating to maintain the temperature in such zone or zones at a preselected value.

Although the present invention is referred to as a "freezer," it can be used to cool product, as well as freeze product, without departing from the invention.

Other embodiments and modifications of this invention will suggest themselves to those skilled in the art, and all such of these as come within the spirit of this invention are included within its scope as best defined by the appended claims.

I claim:

1. Apparatus for freezing products, comprising: an elongated housing having a plurality of openings, means for partitioning the inside of said housing into at least one freezing zone and one pre-cooling zone, means for conveying product through said zones of said housing, at least one removable cover panel positioned on the housing for closing one of the openings, vaporizing means for carrying a supply of cold liquefied gas refrigerant through said pre-cooling zone and adapted to expand gradually the liquefied gas refrigerant into its gaseous phase as the refrigerant passes through the portion of the vaporizing means within said pre-cooling zone and to discharge gaseous refrigerant into said freezing zone, means disposed at the freezing zone including a blower for causing the gaseous refrigerant to repeatedly pass into contact with product in the freezing zone being conveyed by said conveying means, and means disposed at the pre-cooling zone for moving the gaseous refrigerant into contact with product being conveyed through the pre-cooling zone by said conveying means and with said vaporizing means in the pre-cooling zone, said partitioning means providing limited communication between adjacent ones of said zones.

2. Apparatus for freezing products as claimed in claim 1, wherein at least some of said partitioning means include valve elements.

3. Apparatus for freezing products comprising: an elongated housing having a plurality of openings, means for partitioning the inside of said housing into at least one freezing zone and one pre-cooling zone, means for conveying product through said zones of said housing, at least one removable cover panel positioned on the housing for closing one of the openings, vaporizing means for carrying a supply of cold liquefied gas refrigerant through said pre-cooling zone and adapted to discharge gaseous refrigerant into said freezing zone, means disposed at the freezing zone including a blower for causing the gaseous refrigerant to repeatedly pass into contact with product in the freezing zone being conveyed by said conveying means, and means disposed at the pre-cooling zone for moving the gaseous refrigerant into contact with product being conveyed through the pre-cooling zone by said conveying means and with said vaporizing means in the pre-cooling zone, said partitioning means provide limited communication between adjacent ones of said zones and include dividers, and means for removably mounting said dividers in said housing.

4. Apparatus for freezing products comprising: an elongated housing having a plurality of openings, means for partitioning the inside of said housing into at least one freezing zone and one pre-cooling zone, means for conveying product through said zones of said housing, at least one removable cover panel positioned on the housing for closing one of the openings, vaporizing means for carrying a supply of cold liquefied gas refrigerant through said pre-cooling zone and adapted to discharge gaseous refrigerant into said freezing zone, means disposed at the freezing zone including a blower for causing the gaseous refrigerant to repeatedly pass into contact with product in the freezing zone being conveyed by said conveying means, and means disposed at the pre-cooling zone for moving the gaseous refrigerant into contact with product being conveyed through the pre-cooling zone by said conveying means and with said vaporizing means in the pre-cooling zone, said partitioning means provides limited communication between adjacent ones of said zones and includes dividers and means for removably mounting said dividers in said housing, and includes ports in said dividers and valve means cooperating with said ports to control the rate at which the gaseous refrigerant passes through the zones.

5. Apparatus for freezing products as claimed in claim 1, wherein said partitioning means comprising: an elongated housing having a plurality of openings, means for partitioning the inside of said housing into at least one freezing zone and one pre-cooling zone, means for conveying product through said zones of said housing, at least one removable cover panel positioned on the housing for closing one of the openings, vaporizing means for carrying a supply of cold liquefied gas refrigerant through said pre-cooling zone and adapted to discharge gaseous refrigerant into said freezing zone, means disposed at the freezing zone including a blower for causing the gaseous refrigerant to repeatedly pass into contact with product in the freezing zone being conveyed by said conveying means, and means disposed at the pre-cooling zone for moving the gaseous refrigerant into contact with product being conveyed through the pre-cooling zone by said conveying means and with said vaporizing means in the pre-cooling zone, said partitioning means provides limited communication between adjacent ones of said zones and includes dividers, guide means at opposite sides of said housing for receiving and holding said dividers in position, said dividers being removable when related panels are moved to facilitate cleaning of the inside of said housing.

6. Apparatus for freezing products, comprising: an elongated housing including a body section having an open top side and a series of removable panels closing off said open top side, said body section having openings at opposite ends, a conveyor carrying said product through said housing by way of said openings, means for dividing the inside of said housing transversely into at least one freezing zone and pre-cooling zones, means for removably mounting said dividing means, means for supplying vapor of cold liquefied gas to the freezing zone or zones, means for directing the vapor in an upstream direction from said freezing zone to said zones for pre-cooling product on said conveyor, and means in each zone for circulating and recirculating the vapor.

7. Apparatus for freezing products as claimed in claim 6, wherein said supplying means includes conduit means extending through at least one of said pre-cooling zones and having an outlet opening into said freezing zone or zones.

8. Apparatus for freezing products as claimed in claim 6, said conveyor including an endless belt having means for enabling passage of the vapor of cold liquefied gas through said belt, chain means connected to each side of said belt, said belt having upper and lower flights, first sprockets at said openings and engageable with said chain means at both said upper and lower flights, and second sprockets disposed beyond and above said first sprockets over which said chain means are trained.

9. Apparatus for freezing products as claimed in claim 6, wherein each circulating and recirculating means includes a blower, means pivotally mounting said blower for movement between a position in said zone of said housing to a position outside said housing when an associated panel has been removed, a distribution chamber communicating with said fan, and means for removably mounting said distribution chamber in said zone.

10. Apparatus for freezing products as claimed in claim 6, wherein said circulating and recirculating means includes blower means removable from its respective zone.

11. Apparatus for freezing products as claimed in claim 6, wherein each circulating and recirculating means includes a blower, a distribution chamber communicating with said blower, said distribution chamber having a side wall and perforate plate means, and means for removably securing said plate means to said side wall.

12. Apparatus for freezing products as claimed in claim 6, wherein each circulating and recirculating means includes a blower, means for driving said blower and a distribution chamber communicating with said blower, all mounted by an associated one of said panels.

13. Apparatus for freezing products, comprising: an elongated housing including a body section having an open side and at least one removable panel closing off the open side, said body section having openings at opposite ends, a conveyor carrying said products through said housing by way of said openings, means for partitioning the inside of said housing into at least one freezing zone and at least one pre-cooling zone, the conveyor conveying the products from the pre-cooling zone toward the freezing zone, means for supplying vapor of cold liquefied gas to the freezing zone, said supplying means including a conduit in at least one of the pre-cooling zones, means for directing the vapor in an upstream direction from said freezing zone to the pre-cooling zones for pre-cooling product on said conveyor, means in each zone for circulating and recirculating the vapor, traps for vapor at each end of said housing, an infeed conveyor having a discharge end disposed above said conveyor, means in one of said traps for transferring trays successively from said infeed conveyor onto said conveyor, a discharge conveyor having an infeed end disposed above said conveyor, and means in the other of said traps for transferring trays successively from said conveyor to said discharge conveyor.

14. Apparatus for freezing products as claimed in claim 13, wherein said means for transferring trays successively from said infeed conveyor onto said conveyor includes an endless conveyor having means engageable with a tray for lifting a tray from said infeed conveyor and depositing the tray onto said conveyor, and said means for transferring trays successively from said conveyor to said discharge conveyor includes an endless conveyor having means engageable with the tray for lifting the tray from said conveyor and depositing the tray onto said discharge conveyor.

15. Apparatus for freezing products as claimed in claim 13 wherein each zone is covered by an associated one of the removable panels and each panel comprises: an insulated panel section, a molded section secured to the inner side of said insulated panel section, said insulated panel section and said molded section defining a blower chamber and a distribution chamber communicating with said blower chamber, a blower in said blower chamber, means for driving said blower, and an opening in said molded panel at said blower chamber to admit the vapor from said associated zone into said blower chamber, said molded section having an opening at said distribution chamber by which the vapor can be discharged into the zone.

16. Apparatus for freezing products, comprising: a housing having an opening at its infeed end and an opening at its outfeed end, a trap at each end of the housing, one trap communicating with the infeed opening and having a product receiving opening and another trap communicating with the outfeed opening and having a product discharging opening, means for conveying product through said housing and said traps between said product receiving opening and said product discharging opening, means for partitioning the housing into at least one freezing zone and at least one pre-cooling zone, means for supplying vapor of cold liquefied gas into said freezing zone and including a conduit in at least one of the pre-cooling zones, the product receiving and discharge openings being disposed above and in offset positions from the infeed and outfeed end openings in the housing and the product discharging opening being at a higher elevation than the elevation of the product receiving opening to create a pressure head tending to assist passage of vapor through said housing from the supplying means toward the product receiving opening.

17. Apparatus for freezing a product, comprising: an insulated housing having openings at opposite ends thereof, a conveyor carrying said product through said housing by way of said openings, removable means for transversely partitioning the housing into a freezing zone and successive pre-cooling zones upstream of said freezing zone through which said conveyor passes, means for supplying vapor of cold liquefied gas to said freezing zone, said supplying means including a finned tube extending through the pre-cooling zones, said tube having an outlet opening in the freezing zone for discharging the vapor, means in said freezing zone for forcing the vapor by circulation and recirculation in heat exchange relationship with product on said conveyor, means providing passage of the vapor from said freezing zone through said pre-cooling zones, means in said pre-cooling zones for circulating and recirculating vapor in heat exchange relationship with product in said conveyor, and means for maintaining the temperature in said freezing zone at a preselected temperature including a sensing element in said freezing zone and means responsive to said sensing element for controlling the amount of vapor supplied to said freezing zone.

18. Apparatus for freezing a product, comprising: an insulated housing having openings at opposite ends thereof said housing comprising an outer jacket and an inner liner, said jacket and said liner being spaced apart and separate and distinct from each other to permit said inner liner to expand and contract substantially independently of said outer jacket, and insulation material between said outer jacket and said inner liner, a conveyor carrying said product through said housing by way of said openings, removable means for transversely partitioning the housing, into a freezing zone and successive pre-cooling zones upstream of said freezing zone through which said conveyor passes, means for supplying vapor of cold liquefied gas to said freezing zone, said supplying means including a finned tube extending through the pre-cooling zones, said tube having an outlet opening in the freezing zone for discharging the vapor, means in said freezing zone for forcing the vapor by circulation and recirculation in heat exchange relationship with product on said conveyor, means providing passage of the vapor from said freezing zone through said pre-cooling zones, means in said pre-cooling zones for circulating and recirculating vapor in heat exchange relationship with product in said conveyor, and means for maintaining the temperature in said freezing zone at a preselected temperature including a sensing element in said freezing zone and means responsive to said sensing element for controlling the amount of vapor supplied to said freezing zone.

19. Apparatus for freezing products comprising: an elongated housing having a plurality of openings, means for partitioning the inside of said housing into at least one freezing zone and one pre-cooling zone, means for conveying product through said zones of said housing, at least one removable cover panel positioned on the housing for closing one of the openings, vaporizing means for carrying a supply of cold liquefied gas refrigerant through said pre-cooling zone and adapted to discharge gaseous refrigerant into said freezing zone, means disposed at the freezing zone including a blower for causing the gaseous refrigerant to repeatedly pass into contact with product in the freezing zone being conveyed by said conveying means, means disposed at the pre-cooling zone for moving the gaseous refrigerant into contact with product being conveyed through the pre-cooling zone by said conveying means and with said vaporizing means in the pre-cooling zone, said partitioning means providing limited communication between adjacent ones of said zones and said panel and blower are removable as a unit.

References Cited

UNITED STATES PATENTS

| | | | |
|---|---|---|---|
| 3,214,928 | 11/1965 | Oberdorfer | 62—380 X |
| 3,345,828 | 10/1967 | Klee et al. | 62—63 |
| 2,059,970 | 11/1936 | Robillard | 62—374 X |
| 2,494,027 | 1/1950 | Anderson | 62—417 X |
| 2,741,098 | 4/1956 | Janos | 62—417 X |
| 2,951,353 | 9/1960 | Morrison | 62—375 |
| 3,096,627 | 7/1963 | Morrison | 62—178 |
| 3,226,947 | 1/1966 | Wakatsuki et al. | 62—380 |
| 3,255,608 | 6/1966 | Macintosh | 62—374 |
| 3,258,935 | 7/1966 | Ross | 62—374 |
| 3,298,188 | 1/1967 | Webster et al. | 62—63 |
| 3,315,480 | 4/1967 | Rich | 62—63 |

ROBERT A. O'LEARY, Primary Examiner

W. E. WAYNER, Assistant Examiner

U.S. Cl. X.R.

62—65, 380, 382

UNITED STATES PATENT OFFICE
CERTIFICATE OF CORRECTION

Patent No. 3,455,120　　　　　　　　　　　　　　　　July 15, 1969

Alfred H. Schlemmer

It is certified that error appears in the above identified patent and that said Letters Patent are hereby corrected as shown below:

Column 3, line 43, "lower" should read -- blower --. Column 5, line 42, "34" should read -- 34' --. Column 6, lines 52 and 53, cancel "as claimed in claim 1, wherein said partitioning means". Column 8, line 68, after "of" insert a comma; line 75, "housing," should read -- housing --.

Signed and sealed this 19th day of May 1970.

(SEAL)
Attest:

Edward M. Fletcher, Jr.　　　　　　　　　　　WILLIAM E. SCHUYLER, JR.
Attesting Officer　　　　　　　　　　　　　　　Commissioner of Patents